3,260,126
POWER TRANSMISSION BELT
Dale L. Waugh, Springfield, Mo., assignor to Dayco Corporation, Dayton, Ohio, a corporation of Ohio
Filed Nov. 20, 1963, Ser. No. 324,994
9 Claims. (Cl. 74—233)

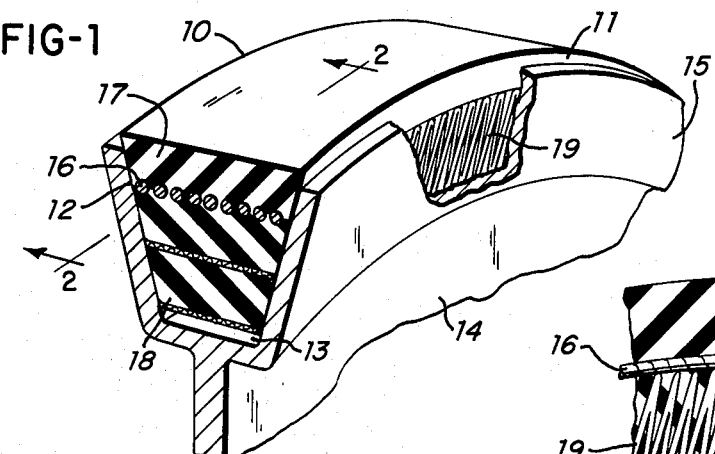
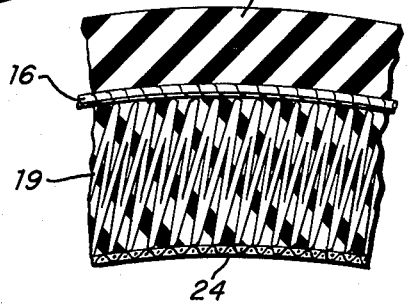
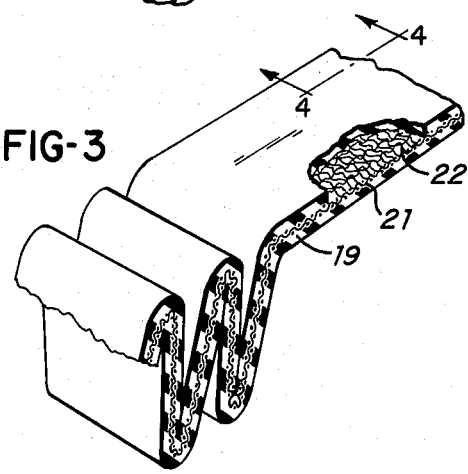
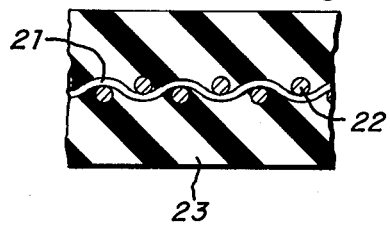
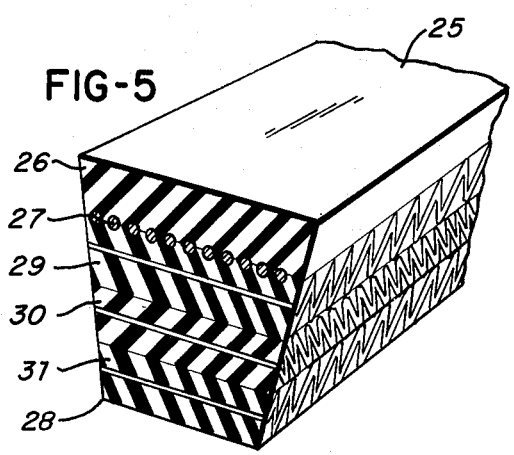
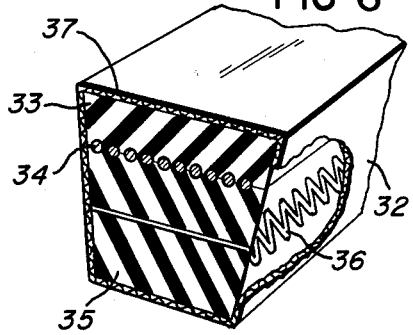
INVENTOR.
DALE L. WAUGH United States Patent Office 3,260,126
Patented July 12, 1966

This invention relates to power transmission belting and particularly to so-called "raw-edge" V-belts wherein the material of the belt's core is exposed to and forms the side driving surfaces of the finished product.

In the art of power transmission, V-belts characterized by a cross section in the form of a trapezoid or a truncated V, which wedgingly engages the similarly shaped peripheral groove of a "V-pulley" are employed in an ever increasing number of applications. A primary reason for this popularity is the improved load-carrying and power-transmitting capability afforded by the forced contact between the sides of the belt and the sides of the pulley groove which resists slippage of the belt in the pulley. One problem created by this relationship, however, is the lateral strength or stiffness required of the pulley-engaging portion of the belt to enable it to withstand the wedging tendency on the one hand and to capitalize on it for firm engagement with the pulley on the other. At the same time, optimum life and performance demand a highly flexible construction to meet the demands of severe belt flexibility. Various compromises and balances between necessary stiffness or rigidity on one hand, and for flexibility on the other have been achieved in the prior art; normally, improvement in one of these properties involves an attendant loss and sacrifice in the other. Thus, the compression section of the belt (that portion inwardly of the inextensible load-carrying band which is contacted by the sides of the pulley groove) is normally formed of laminae of rubberized fabric. This provides the necessary lateral strength, but the fabric laminations impair the flexibility of the belt, in many cases to an excessive and intolerable degree. Other attempts have been made to provide lateral stiffness to the pulley-contacting portion of the belt, involving the admixture of discrete textile fibers with the elastomeric material of which the compression section of the belt is formed. While the presence of the discrete fibers does not impair belt flexibility to the same degree as do the fabric layers, neither does it provide the same degree of lateral stiffness, and the load that can be transmitted by the belt without its slippage in the pulley is therefore substantially lessened and the power transmission capacity considerably reduced.

In addition to the power transmission considerations discussed above, experience has shown that the most advantageous relationship between the belt and the pulley at their mutually contacting surfaces involves many other complex considerations which affect the noise and vibration of operation and the life of the belt, the pulleys, and the bearings of the drive. It is known that the manner in which the belt distributes the compression wave created by the inward flexure of the belt is of considerable significance, as are the characteristics of smoothness, uniformity, and continuity of the pulley-contacting side surfaces of the belt. Many of these problems are particularly pertinent to V-belt drives, and are quite critical where the V-belts are not provided with an outer cover because the core material is exposed to and comprises the side-driving surfaces of the belt. Problems of such drives are further complicated where it is necessary for the V-belt to be reversely bent, as for example where it is made to pass over an idler pulley or sheave which bears against the top or outer surface of the closed belt loop.

It is accordingly the primary object of the present invention to provide an improved power transmission belt.

It is another object of the invention to provide an improved V-belt wherein the portion involved in the wedging contact with a pulley combines lateral ridigity to maintain a nonslipping contact with the pulley, with flexibility permitting a minimum of energy dissipation.

Still another object of the present invention is to provide such a power transmission belt wherein the material comprising the power transmission core is exposed to and forms the side-driving surfaces.

Yet another object of this invention is to provide a V-belt which may be flexed repeatedly in either an inward or an outward direction without substantially shortening its operational life.

To achieve the foregoing and other objects and advantages hereof, which will be apparent from a reading of the following disclosure, the present invention teaches that the compression section of the belt, which is the portion involved in the wedging contact between the belt and the pulley, is composed of a pleated fabric wherein the folds thereof are angularly disposed to the pulley-contacting belt surfaces and are preferably at right angles to the longitudinal axis of the belt. It is also possible to form pleats at different angles, by forming them on a bias. In a modification of this invention the compression section of the V-belt may be composed of two or more distinct layers of the pleated fabric wherein the pleats are angularly disposed to a transverse vertical plane through the belt.

The fabric to be pleated according to this invention is treated with an elastomeric material such as rubber, either natural or synthetic; or a urethane elastomer, by coating one or both sides of the fabric with a layer or skim coat of such material, or by both impregnating and skim-coating one or both sides with the elastomer. In the usual situation, the amount of elastomeric material thus imparted to the fabric will be substantially equal in volume to the fabric itself with the result that the finished product might be considered as consisting of the elastomeric base or matrix in which the pleated fabric is embedded. It can be appreciated that considerable variation in the belt is possible, depending upon the relationship of the folds to the cross-woven threads of the fabric, upon the disposition of the folds and/or of the threads relative to the sides of the belt, and upon the number and closeness of successive pleats. Where the pleats are very close together and where pleats are provided in separate and superimposed layers within the compression section, the exposure of the fabric to the belt edges is considerably greater. This is especially true where the pleats are so arranged that either the warp or the weft threads are parallel to the side-driving surfaces of the belt. Whereas this tends to reduce the non-slippage engagement between belt and pulley, it has been found to have the salutary effect of reducing vibration and noise. The degree of lateral stiffness or transverse strength may also be varied by changing the angularity of the folds relative to the longitudinal axis of the belt. Where the folds are at right angles to such axis and are therefore normal to the side-driving surfaces, it has been found that the maximum lateral stiffening is provided. Notwithstanding the fact that such a belt is capable of providing the most firm contact between the wedged belt and the pulley, the belt is still extremely flexible and has been found to be free of noise and vibration in operation. It is believed that these latter phenomena are attributable to the unique manner in which the pleated fabric stops and redirects the "compression wave" or the deformation of the substantially incompressible elastomeric material as it is constrained in flexing by the confining influence of the inextensible load-carrying layer of the belt and of the side walls of the pulley. It is believed that the net effect of this redirection of the compression wave is that the distortion which normally tends to take place on the sides of the belt occurs at its bottom surface; and since in V-belt drives the belt does not rest against the bottom of the pulley, such distortion causes no cyclic disturbance and a minimum of internal stress.

The invention thus generally described may be more clearly understood and appreciated from the following detailed description of certain preferred embodiments thereof in connection with which reference may be had to the appended drawings, in which:

FIGURE 1 is a fragmentary perspective view in partial cross section of a belt according to this invention operating within a pulley.

FIGURE 2 is a cross-sectional view taken on the line 2—2 of the belt illustrated in FIGURE 1.

FIGURE 3 is a fragmentary perspective view of the rubberized fabric component of a belt according to this invention.

FIGURE 4 is a cross-sectional view taken along the line 4—4 of FIGURE 3.

FIGURES 5 and 6 are perspective views in partial cross section of two modified forms of belt according to this invention.

Referring now to FIGURES 1, 2 and 3, it will be observed that this invention relates generally to a conventional V-belt 10, the cross section of which is in the form of a truncated V or a trapezoid, the side-driving surfaces 11 and 12 of which are inwardly convergent. The belt is positioned within the peripheral groove 13 of the pulley 14, the flanges or sides 15 of which are also convergent in the same manner as the sides of the V-belt, as a result of which the belt is held in wedging relationship by and within the pulley groove.

In the manner of most power transmission V-belts, it will be observed that a typical embodiment of this invention includes a strength or load-carrying section principally comprising longitudinally extending cords 16 which are spaced transversely of the belt. These cords are located at the neutral axis, which is the axis about which the belt would normally flex. The material inwardly thereof is under compression, and the material outwardly thereof is under tension, when the belt passes about the pulley as shown. The relatively inextensible strength cords 16 carry the load, and the remainder of the belt body performs the primary function of presenting contact areas sufficient to insure a firm grip between the belt and the sheaves which it drives and by which it is driven. In some cases, further strength is imparted by the use of additional fabric layers, superimposed one upon the other at least in the tension section 17 which is that area of the belt normally placed under tension during flexing. It is in combination with these more or less conventional V-belt components that the novel compression section 18 is employed, embodying the pleated fabric 19. In this particular embodiment the section is defined by a succession of pleats or folds as shown in FIGURE 2 extending in a longitudinal direction from the top to the bottom of the compression section, each of the pleats extending transversely of the belt at approximately vertical planes through the belt.

In the belt illustrated in FIGURES 1 and 2, it will be observed that the pleated fabric 19 occupies the compression section 18 from the base thereof to the surface immediately underlying the strength cords 16. Inspection of FIGURE 1 discloses that this depth corresponds substantially to the depth of the wedging penetration of the belt within the pulley groove 13 so that the pleats provide maximum lateral support for the wedging relationship. It is to be noted further that the pleated fabric is irregularly exposed to the edges 11 and 12 of the belt in a zig-zag pattern and thereby influences the surface characteristics of the edges which are in sliding contact with the pulley sides as the belt enters and leaves the groove. The amount of fabric thus exposed to the pulley-contacting belt surfaces and the degree of lateral rigidity provided by the pleats may be varied in the first instance by changing the spacing or pitch between the pleats. The relatively open spacing of the pleats in the drawing is for clarity of illustration; while in the actual belt, the successive pleats will be practically contiguous, being separated by a layer of rubber or related elastomeric material of only nominal thickness.

While the pleated fabric 19 might be viewed as embedded or encased in the elastomeric matrix comprising the compression section 18 of the belt, it is more correct to consider the compression section as being entirely composed of the fabric which is rubberized. As illustrated in FIGURES 3 and 4, such rubberized fabric may consist of the fabric comprising the cross-woven threads 21 and 22, being warp and weft, respectively, which are encased and the voids therebetween filled with an impregnating elastomeric material 23. Depending upon the thickness of the fabric, the desired spacing between pleats and/or the proportion of the belt edges desired to be represented by exposed fabric, the thickness of the various rubberizing layers may be controlled by conventional techniques in the calendering operation by which they are applied to the fabric. The belt illustrated in FIGURES 1 and 2 is shown to comprise a conventional layer of rubberized fabric 24 at the base of the compression section, and this fabric does somewhat increase the lateral strength of the belt without substantially interfering with the manner in which the compression wave is distributed by the "accordion action" of the pleats. However, the base fabric may conveniently be omitted in belts embodying the features of this invention.

As a means of further modifying the operational characteristics of the finished product, the pleats may be formed by folds at various angles to the cross-woven threads of the fabric. In the preferred embodiment illustrated and characterized in FIGURES 1, 2, 3 and 4, it will be observed that the folds in the fabric correspond to the direction of the weft threads and the folds then are positioned transversely of the belt so that the warp threads extend longitudinally thereof. In this position the pleated warp threads are parallel to the side-driving surfaces for maximum exposure thereupon. When the fabric is pleated on a bias, the threads lie at other than right angles to the longitudinal axis and the side-driving surfaces, and flexibility is improved; however, lateral rigidity is somewhat reduced.

As a further modification of this invention, the compression section may comprise a plurality of superimposed pleated fabric laminae wherein the pleats are wholly within each lamina, rather than a single layer as described above. Such a design is illustrated in FIGURE 5, in which a conventional tension section 26 and strength cords 27 form part of belt 25. The compression section 28 is of multi-ply pleated fabric construction, consisting of an outer layer 29, middle layer 30, and inner layer 31, each formed by pleated impregnated fabric as illustrated in FIGURE 3. In order to provide optimum driving function and to inhibit any reinforcement of cyclic vibrations or other noise and wear-producing causes, the successive pleated fabric layers are preferably so disposed that the pleats of one layer will be at the reverse angle to the pleats of the adjoining layer. Thus, it will be observed that the pleats of the outer and inner layers 29 and 31 are inclined in one direction from a transverse vertical plane through the belt, whereas the pleats in the center section 30 are inclined to the same degree but in the opposite direction from the vertical plane. It should be recognized, of course, that two, four, or even more layers of pleats may be utilized, instead of the three layers illustrated.

In the manufacture of belts according to the present invention, the fabric of nylon, polyester, cotton, rayon, or the like which is conventionally used in belting is impregnated by one or more passes through a calendering operation. The fabric thus rubberized is then run through a pleating machine to impart the configuration substantially as indicated in FIGURE 3. Again, however, the openness of the pleats illustrated in FIGURE 3 is for the sake of clarity only; and, in the actual pleated fabrics, the successive pleats will be contiguous. In most cases moreover, the tackiness of the rubberized surfaces will be such that the pleats will be held together and the pleated fabric layer handled just like a pure elastomeric layer of comparable thickness in being wound upon a mandrel or otherwise incorporated in the belt body. As is customary in the manufacture of V-belts, the pleated layer may be incorporated into a sleeve or cylindrical shell from which individual V-shaped belts may then be cut by rotating knives or the like, either before or after the elastomeric material has been vulcanized.

A further form of the invention is illustrated in FIGURE 6. The belt 32 consists of the conventional tension section 33 and strength cords 34. The compression section 35 also includes a pleated fabric member 36, fabricated in the same manner as previously described. In this modification, however, the fabric does not comprise the entire depth of the compression section, but is located in only a portion of the section, as shown. In certain cases, even this limited pleat provides useful lateral rigidity to the belt. The belt 32 also is shown as having a fabric cover 37 completely surrounding the belt, but if desired, this cover may be omitted. This feature is also true of the other forms of the invention; although they have been illustrated and described as "raw-edge," they may be made with a cover in the manner of a wrapped belt.

While the invention has been described in considerable detail in connection with certain preferred embodiments thereof, it is to be understood that the foregoing particularization has been for the purpose of illustration only and does not limit the scope of the invention as it is defined in the subjoined claims.

What is claimed is:

1. A power transmission belt comprising an outer tension section, an inner compression section, and an intermediate load-carrying portion, said compression section comprising a series of fabric pleats extending transversely of said belt for the entire width thereof, said pleats having folds which are disposed in a direction from the inner toward the outer surface of said belt and at substantially right angles to the longitudinal axis thereof.

2. The belt of claim 1 in which the fabric of said pleats is impregnated with elastomeric material.

3. The belt of claim 2 in which said pleats are angularly disposed to the sides of said belt.

4. The belt of claim 3 in which a portion of the fabric of said pleats is exposed at the side surfaces of the belt.

5. A power transmission V-belt comprising a tension section, an inextensible load-carrying section disposed at the neutral axis of the belt, and a compression section inward of said load-carrying section, said compression section comprising superimposed layers of a series of fabric pleats extending transversely of said belt for the entire width thereof, said pleats having folds which are disposed in a direction from the inner toward the outer surface of said belt and at substantially right angles to the longitudinal axis thereof.

6. The belt of claim 5 in which the fabric of said pleats is impregnated with elastomeric material.

7. The belt of claim 5 in which said pleats are angularly disposed to the sides of the belt.

8. The belt of claim 5 in which a portion of the fabric of said pleats is exposed at the side surfaces of the belt.

9. A power transmission belt according to claim 8 wherein the pleats of adjacent layers are angularly oppositely disposed to a transverse vertical plane through the belt.

References Cited by the Examiner

UNITED STATES PATENTS

| | | | |
|---|---|---|---|
| 1,579,293 | 4/1926 | Falor | 156—137 |
| 1,920,525 | 8/1933 | Roderwald | 74—233 |
| 1,989,168 | 1/1935 | Freedlander | 74—233 |
| 2,016,140 | 10/1935 | Freedlander | 74—233 |
| 2,037,954 | 4/1936 | Weber | 74—233 |
| 2,214,098 | 9/1940 | Carlson | 74—233 |
| 2,239,635 | 4/1941 | Walton | 156—137 |
| 2,417,512 | 3/1947 | Nassimbene | 74—233 |
| 2,726,976 | 12/1955 | Waugh | 74—233 |
| 2,739,090 | 3/1956 | Waugh. | |
| 2,766,159 | 10/1956 | Adams et al. | 74—232 |
| 2,770,977 | 11/1956 | Beckadolph et al. | 74—229 |
| 3,127,780 | 4/1964 | Buhrmann | 74—229 |

DAVID J. WILLIAMOWSKY, *Primary Examiner.*

FRANK SUSKO, *Examiner.*

J. A. WONG, *Assistant Examiner.*